US006347731B1

(12) United States Patent
Burger

(10) Patent No.: US 6,347,731 B1
(45) Date of Patent: Feb. 19, 2002

(54) EASILY REMOVABLE PICKUP TRUCK BED RACK

(75) Inventor: George W Burger, Rocklin, CA (US)

(73) Assignee: Hillerich & Bradsby Co., Louisville, KY (US)

(*) Notice: Subject to any disclaimer, the term of this patent is extended or adjusted under 35 U.S.C. 154(b) by 0 days.

(21) Appl. No.: 09/630,726

(22) Filed: Aug. 2, 2000

(51) Int. Cl.[7] ............................................. B60R 9/00
(52) U.S. Cl. ..................... 224/405; 224/402; 224/403
(58) Field of Search ................................ 224/405, 402, 224/403, 495, 497; 296/3

(56) References Cited

U.S. PATENT DOCUMENTS

| | | | | |
|---|---|---|---|---|
| 4,138,046 A | * | 2/1979 | DeFreze | 224/405 |
| 5,037,152 A | * | 8/1991 | Hendricks | 296/3 |
| 5,108,141 A | * | 4/1992 | Anderson | 296/3 |
| 5,143,415 A | * | 9/1992 | Boudah | 224/405 X |
| 5,152,570 A | * | 10/1992 | Hood | 296/3 |
| 5,431,472 A | * | 7/1995 | Coffland | 296/3 |
| 5,439,152 A | * | 8/1995 | Campbell | 224/405 |
| 5,725,137 A | * | 3/1998 | MacDonald | 224/405 |
| 5,836,635 A | * | 11/1998 | Dorman | 296/3 |
| 5,927,782 A | * | 7/1999 | Olms | 296/3 |

* cited by examiner

*Primary Examiner*—Gregory M. Vidovich
*Assistant Examiner*—Maerena W. Brevard

(57) ABSTRACT

A collapsible truck bed rack for pickup trucks that is formed from four separate frame assemblies that can be installed on a truck or removed in five minutes or less without using tools. A unique means of arranging and fastening the top four corners of an installed rack is employed to create considerable stiffness in the rack corner structure, while permitting flexibility in rack length and width without compromising structural stiffness or strength. For storage, the separate assemblies are collapsible into two or more parts using quick disconnect means and may be packed compactly in a sack for placing in a pickup truck. The rack has a simple configuration, uses no complex parts requiring special machining or molds, and uses standard fastening components. It is therefore economical to manufacture and could be made available to small pickup truck owners at a relatively low cost.

9 Claims, 7 Drawing Sheets

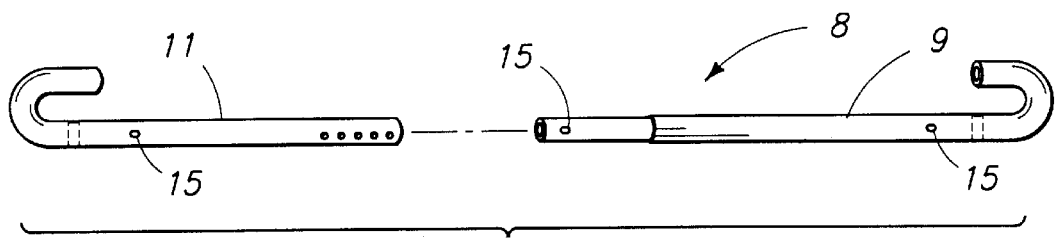
FIG. 4
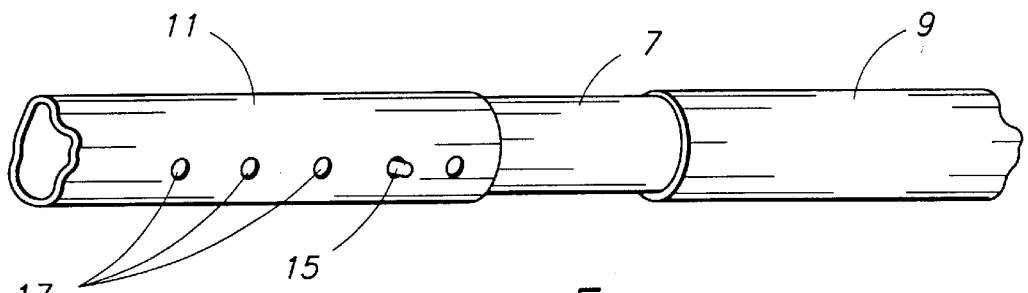
FIG. 5
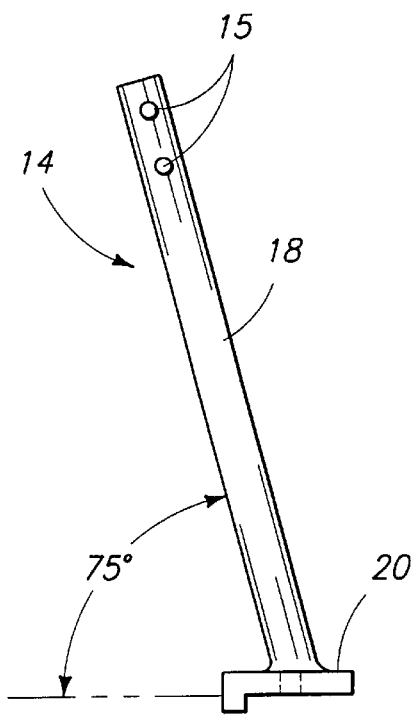 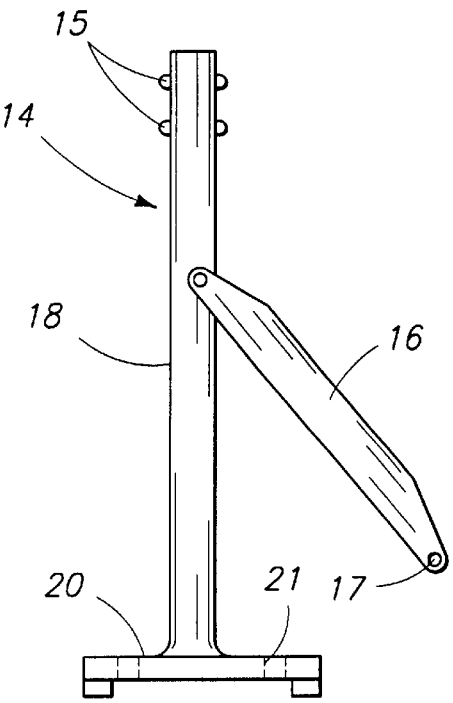
FIG. 7A    FIG. 7B

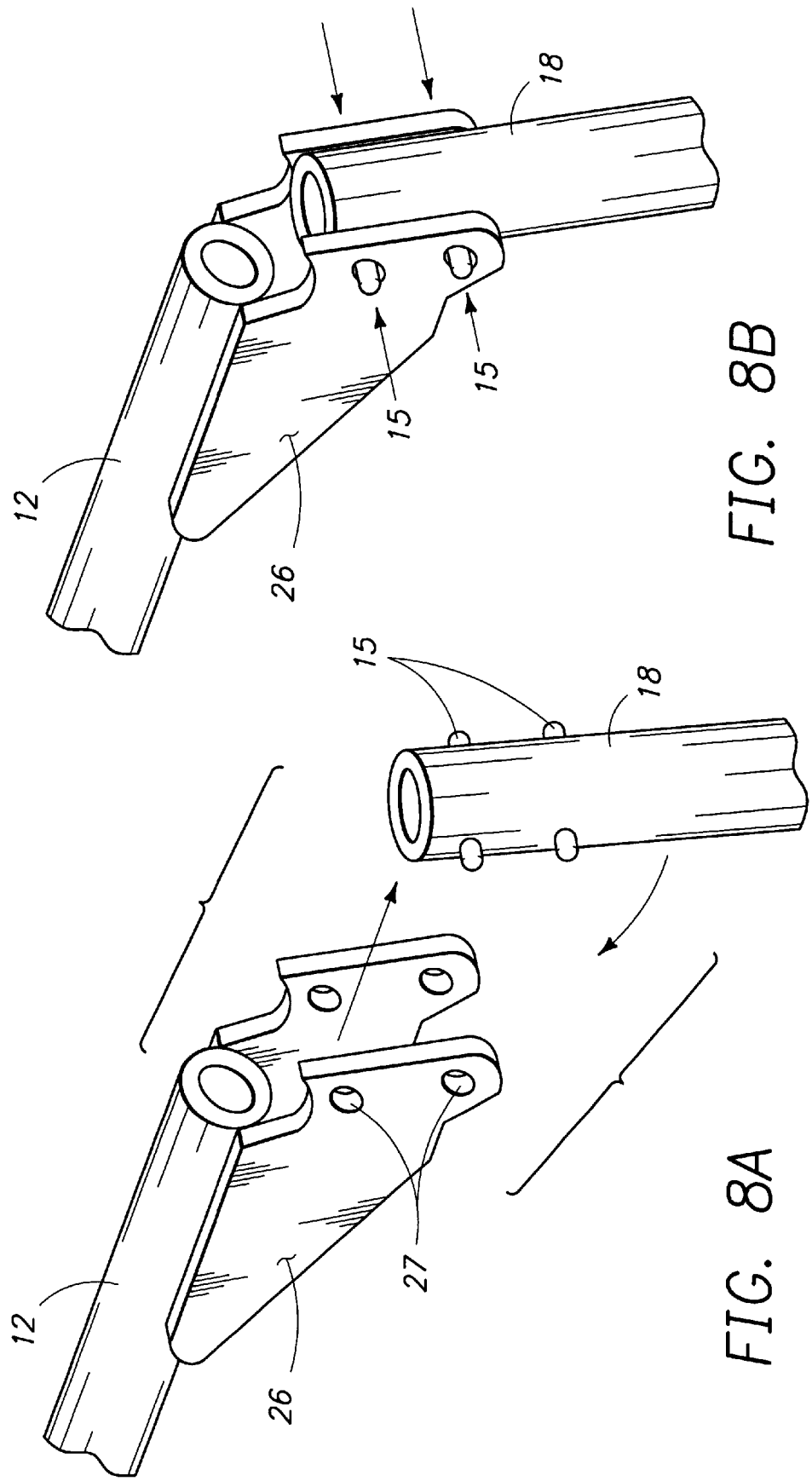

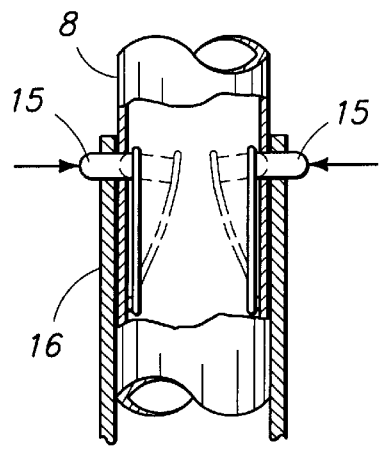
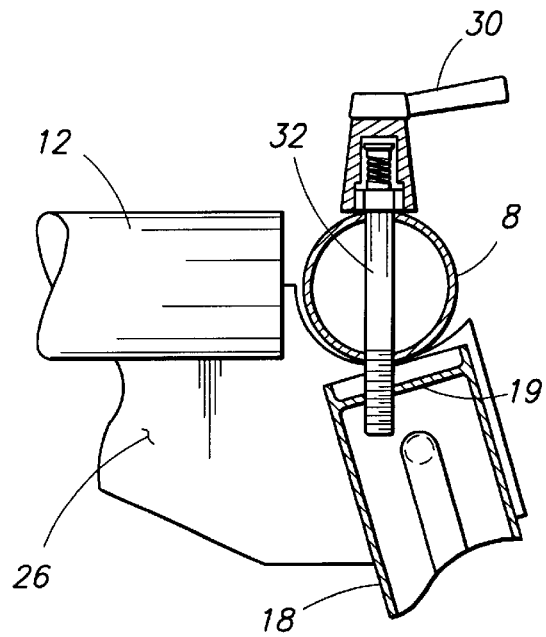
FIG. 10          FIG. 11
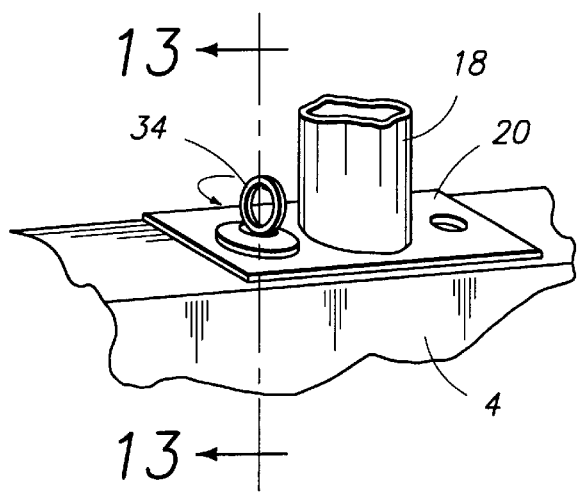
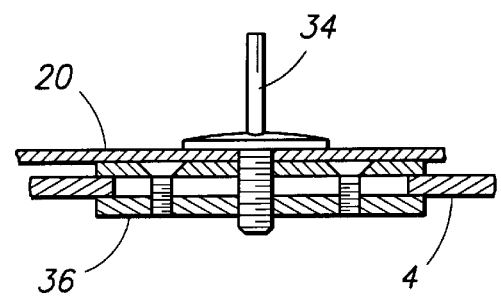
FIG. 12          FIG. 13

EASILY REMOVABLE PICKUP TRUCK BED RACK

BACKGROUND OF THE INVENTION

1. Field of the Invention

This invention relates to racks that are used with pickup trucks for carrying material at some elevation above the truck bed.

2. Background There are presently many different types of truck bed racks available and in use. Some commonly seen racks are welded frames that may be bolted in vertical position to the sides of a truck bed when required for use. Others are collapsible, using some spring-pin connections plus bolts and screws, and are removable for storage. Examples of these devices are described in U.S. Pat. Nos. 5,927,782, 5,725,137, 5,836,635, 5,143,415 and others. All the racks require tools for installation on a truck that, in most cases, takes an appreciable amount of time and physical effort. Disassembly of the racks can thus also be a chore, even for those racks utilizing spring-pin connections for some parts. Storage of a disassembled rack is usually accomplished by simply tying the various parts together, including bolts, nuts and washers. This makes it difficult to produce a compact package suitable for storage in an available pickup truck space that is typically small.

A user annoyance and possible problem area is created when a rack installation requires pre-installation of a permanently attached fastening track or sets of large, fixed bases to the top of the truck sides, as some presently available rack configurations do. These items often get in the user's way when loading the truck bed area below the rack, as any pickup truck owner will testify.

There is therefore a need for a light weight, truck bed rack that can be quickly and easily installed and removed by anyone having only moderate strength. There is also a need for a collapsible truck bed rack that can be stored compactly in a very small truck space.

SUMMARY OF THE INVENTION

A collapsible truck bed rack intended for pickup trucks is described that is constructed using two identical end frames and two identical side frame members. The end frames and side frame members are joined together by only four levered bolts and by spring-loaded push pin disconnect means for quick and easy installation and removal without need for tools. The rack can be installed or removed in five minutes or less. In preparation for storage, the end frames and side frame members are collapsible into two or more parts, using spring loaded push pin disconnect means. A unique means of arranging and fastening the top four corners of an installed rack is employed to create stiffness in the rack structure while permitting flexibility in rack size without compromising structural stiffness or strength. The preferred rack fabrication material is steel tubing and plates for adequate load carrying strength. Four separately located stake pocket anchors that are permanently installed on a pickup truck sides are used to mount the rack support legs in a manner permitting quick fastening or removal.

Accordingly, it is a principal object of this invention to provide a low cost truck bed rack that can be quickly installed or removed and disassembled by any adult without use of tools or much manual strength.

Another object is to provide a truck bed rack that can be disassembled into a set of compactly arranged bagged parts requiring only a small storage space in a pickup truck.

A rack advantage is its remarkable rigidity and stiffness combined with flexibility in truck bed size applications.

Further objects and advantages of the invention will be apparent from studying the following portion of the specification, the claims and the attached drawings.

BRIEF DESCRIPTION OF THE DRAWINGS

FIG. 4 is a side view of a side frame assembly in accordance with the present invention, showing its two mating frame sections separately;

FIG. 5 shows detail of side frame part connection thereof;

FIG. 7A is a front elevation view of a leg member that is part of an end frame assembly;

FIG. 7B is a side elevation view thereof, particularly showing a pivotable support strut for connection to a side frame assembly;

FIGS. 8A and 8B illustrate the method of joining a cross frame assembly to the top of a leg stanchion, particularly showing the action of spring-loaded pins in holding the parts together;

FIG. 10 is a cross-section view of a typical spring-loaded pin configuration which is used for holding all the frame assemblies to each other;

FIG. 11 is an end cross-section view of the method of joining one end of a side frame assembly to an end frame assembly;

FIG. 12 is a view of a frame leg base that is fastened to the side wall of a pickup truck for installation; and FIG. 13 is a cross-section view taken along line 13—13 of FIG. 12, particularly showing the leg base portion bolted to an anchor device that is attached in the wall of a pickup truck.

DESCRIPTION OF THE PREFERRED EMBODIMENT

Figure 1:
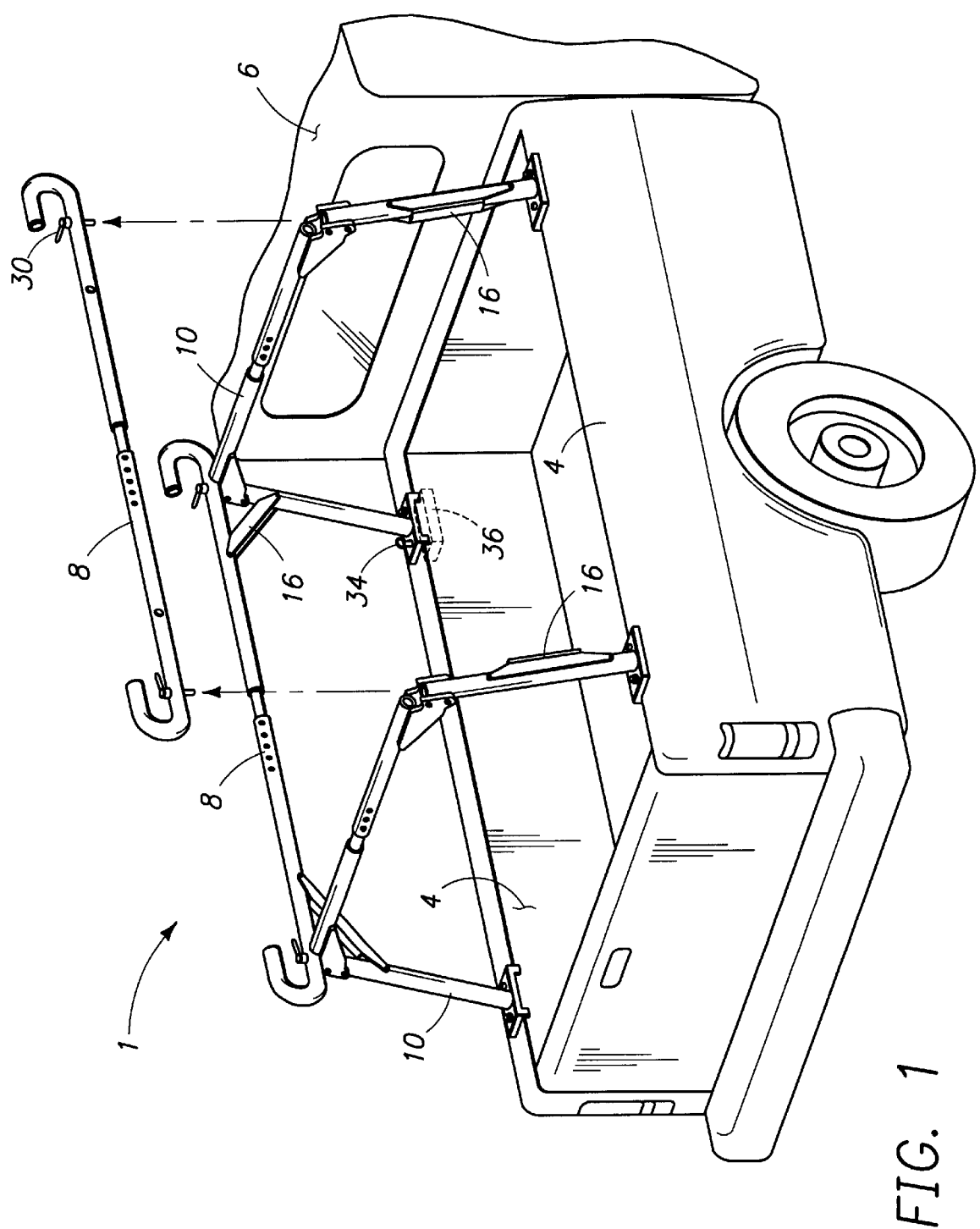
FIG. 1 is a perspective view of a truck bed rack according to the present invention, in the process of being installed on a pickup truck.

Referring particularly to the drawings, there is shown in FIG. 1 a truck bed rack 1, according to the present invention installed on the sides 4 of a pickup truck 6, except for one side frame assembly 8. This side frame assembly 8 would be fastened at each end to the end frame assemblies 10, using fixed bolt levers 30 attached to the side frame assembly. A strut 16 that is mounted on each support stanchion would then be pivoted and snapped on to the side frame assembly 8, holding the side frame assembly 8 rigidly in place. At the start of the rack 1 installation, the four support stanchions that are parts of the two end frame assemblies 10, are each fastened at their base to the sides 4 of the truck 6. This is done by turning a ring-headed screw 34 into a small sized stake pocket anchor 36 that is permanently fixed to the truck sides 4 below the side top surface.

The completed rack 1 is made using steel tubing and steel sheet parts. It is rigid and strong enough to support items such as wood planks, sheets or ladders such as may be found in typical building material supply stores for "do-it-yourself" homeowners as well as for professional building contractors. Each side frame assembly 8 has looped ends that may be used for carried article retention or securing.

In designing the truck bed rack, particular attention was paid to the matter of ease and speed of assembly and disassembly. The resulting rack 1 configuration has been tested and found to be easily disassembled and removed from a truck in five minutes or less, all without tools. It can also be assembled in place per FIG. 1 in about the same time.

The rack features that make these short times possible are:

a) there are only four major assemblies to be disconnected from a truck: two side frame assemblies 8 and two end frame assemblies 10;

b) spring-loaded push pin connections are used as quick release means in every place where assembly separate components and the four major assemblies are joined; and c) a total of eight screw bolts are used, all of which have incorporated either levers or large turning rings for easy handling, requiring no tools and little applied manual strength for installation or removal.

Figure 2:
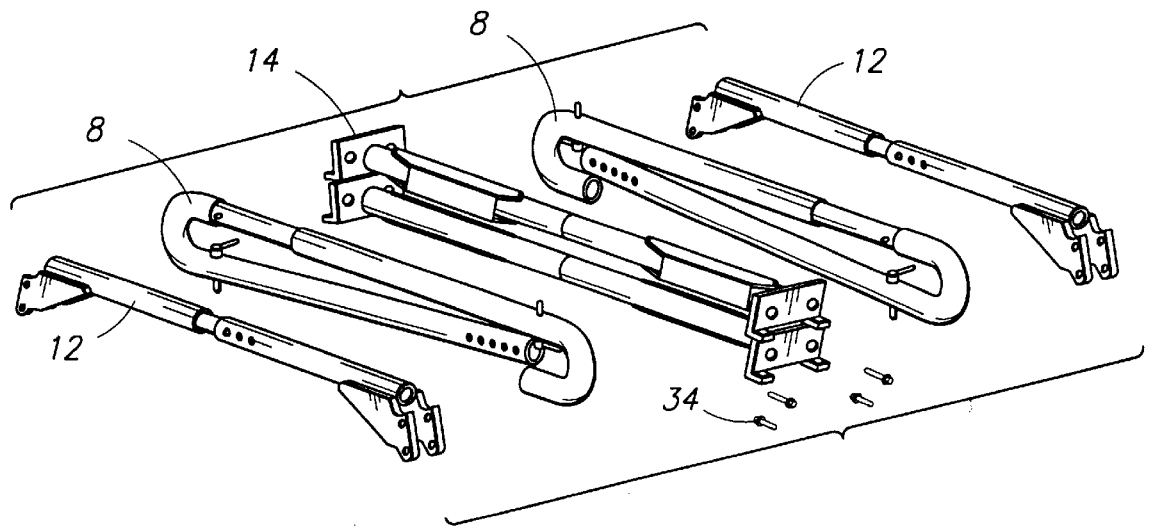
FIG. 2 is a view of the rack disassembled components, folded compactly for storage.
Figure 3:
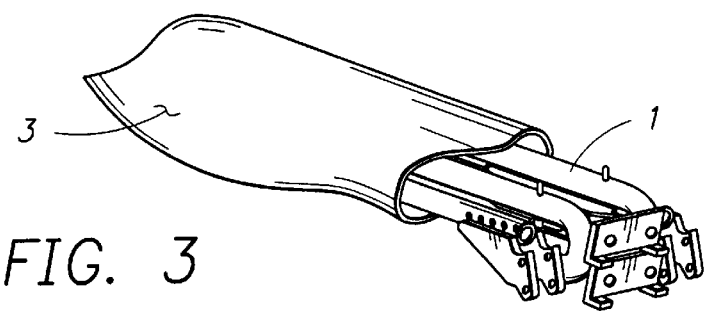
FIG. 3 shows the rack folded components being fitted in a sack for storage on a truck.

Refer now to FIGS. 2 and 3. FIG. 2 shows how the major rack assemblies are further disassembled and arranged for packing. The two end frame assemblies 10 each have their cross frame assembly 12 removed by depressing connecting end spring-pins. The remaining four leg assemblies 14 are then stacked together as shown. The two side frame assemblies 8 are each disconnected into two parts and arranged as shown. This leaves four leg base fastening bolts 34 which may be put into a small plastic bag. The above procedure can be performed very quickly if necessary, again without any tools. FIG. 3 shows the rack 1 subassemblies being placed in a sack 3 for compact storage in the cab of a pickup truck or other area.

Refer now to FIGS. 4 and 5 which are respectively, an exploded view of the side frame assembly 8 and a detailed view of the frame assembly joining area. The side frame assembly 8 comprises two mating elements that engage telescopically: a tubular insert member 9 and a tubular receptor member 11. Both the insert member 9 and receptor member 11 have one end that is curved back in a loop. This looped end is provided to retain articles carried on top of the rack from sliding off the ends. The loops may also be used for tieing articles to an installed rack 1.

The insert member 9 has a stepped down diameter portion 7 on its end distal to the looped end, sized to fit inside the mating end of the receptor member 11. Located near the end of the stepped down portion 7 is a spring-loaded push pin 15, that fits in any of five aperture holes 17 in the receptor member 11 wall for joining the two members. This arrangement is primarily for facilitating any adjustment in length that a user may need to make when initially installing a side frame assembly 8 on the end frame assemblies 10 over a truck bed. Normally, a side frame assembly 8 would not be disassembled into two members unless it was intended to pack the assembly parts for storage.

Another spring-loaded push pin 15 is located on the insert and receptor members near to their looped end, for the purpose of fastening to a frame stiffening strut. A through hole is also provided in each member, located in its looped end for connecting the side frame assembly 8 by a levered screw bolt 30 to an open corner of an end frame assembly 10 as depicted in FIG. 1.

Figure 6:
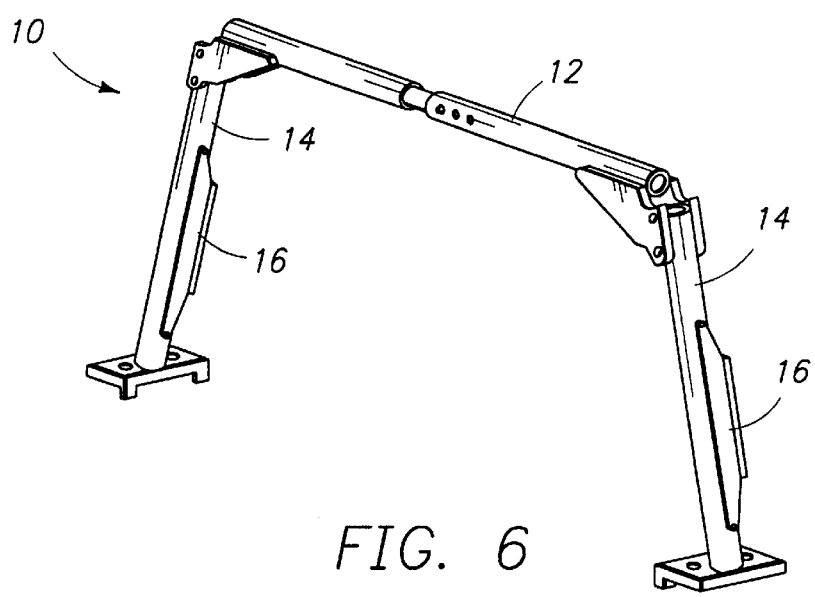
FIG. 6 is a perspective view of an end frame assembly in accordance with the present invention.

Refer now to FIGS. 6, 7A, 7B and 8. The end frame assembly 10 as depicted in FIG. 6 comprises two identical leg members 14 and a cross frame assembly 12. Pivotably attached to each leg member 14 is a strut 16 that is used to fasten to a side frame assembly 8 for stiffening purposes. The strut 16 may be arcuate in cross-section medially at extremities.

A leg member 14 is shown in front view in FIG. 7A and side view in FIG. 7B. Each leg member 14 comprises a support stanchion 18, a leg base member 20 that is joined to the bottom of the stanchion 18, a strut 16 that is pivotably mounted at one end to the side of the stanchion 18, an end plug 19 that is located inside the top end of the stanchion 18, and four spring-loaded push pins 15 as a means for joining a leg member 14 to a cross frame assembly 12.

Figure 7C:
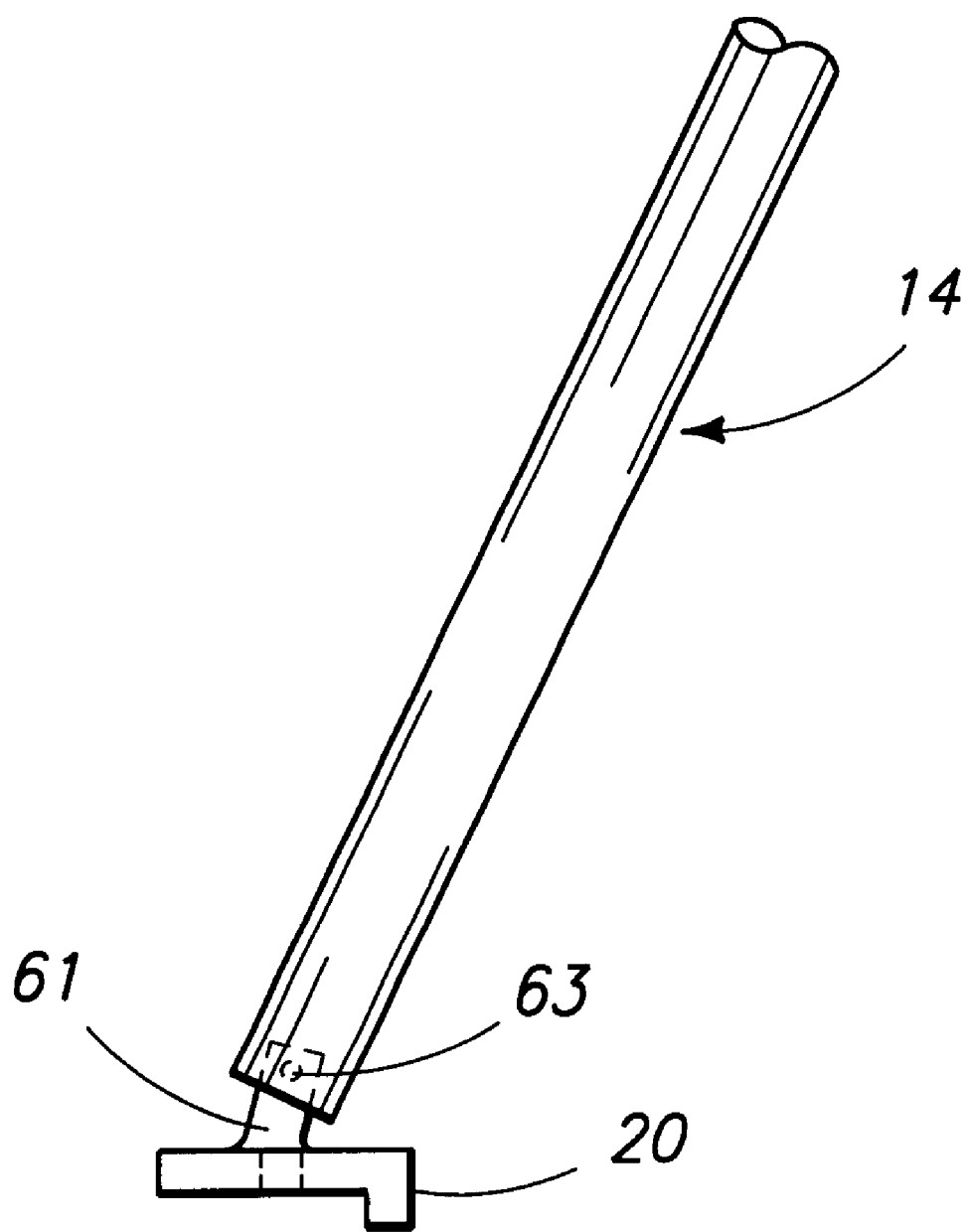
FIG. 7C is a side elevation view of a leg member, particularly showing an alternate pivotable connection to its base.

FIG. 7C depicts an alternate method of joining a leg member 14 stanchion to a base member 20, by connecting the lower end of the stanchion to a pivot pin 63 that is secured to a tang 61 projecting above the base member 20, thereby allowing the stanchion to be pivoted about the base through a small angle.

The stanchion 18 is angled with respect to the horizontal plane of the leg base member 20 by about 75 degrees, so that the leg member 14, when connected at its top end to a cross frame assembly 12, will project downward and outward at an angle of about 105 degrees as depicted in FIGS. 1 and 6. This is done to provide strong support for the rack top members and the end frame assembly 10. Two holes 21 are cut through the base member 20 for the fastening screws used to fasten the leg members to the top sides of a pickup truck.

Figure 8:
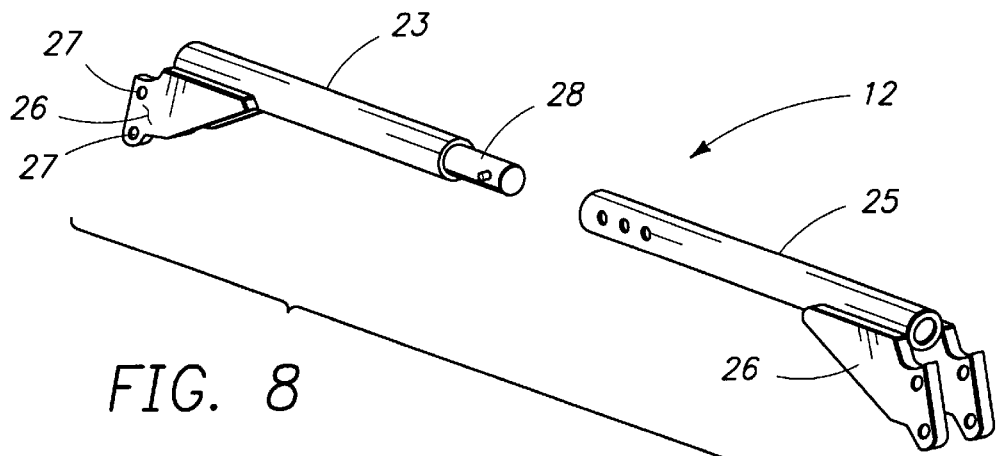
FIG. 8 is a perspective view of a cross frame assembly, showing its two telescoping frame members separately.

FIG. 8 is a perspective view of the two mating parts forming a cross frame assembly 12. The two parts are a tubular end insert member 23 and a tubular end receptor member 25. Both members are identical in size and construction with the exception of their mating ends. As for the side frame assembly 8, the insert member 23 end has a reduced diameter portion 28 that includes a spring-loaded push pin. The receptor member 25 end includes several holes in its wall, lined up to receive a push pin when the two members are joined. In assembly the insert member 23 and the receptor member 25 engage telescopically, permitting the overall length of the cross frame assembly to be adjusted in length.

Both members 23, 25 have welded to their distal ends, two paralleled gusset plates 26. Two holes 27 are cut in each gusset plate, near its projecting edge as a means of connecting with spring-loaded push pins 15 near the top of each leg stanchion 18. This connection method is illustrated in FIGS. 8A and 8B.

Figure 9:
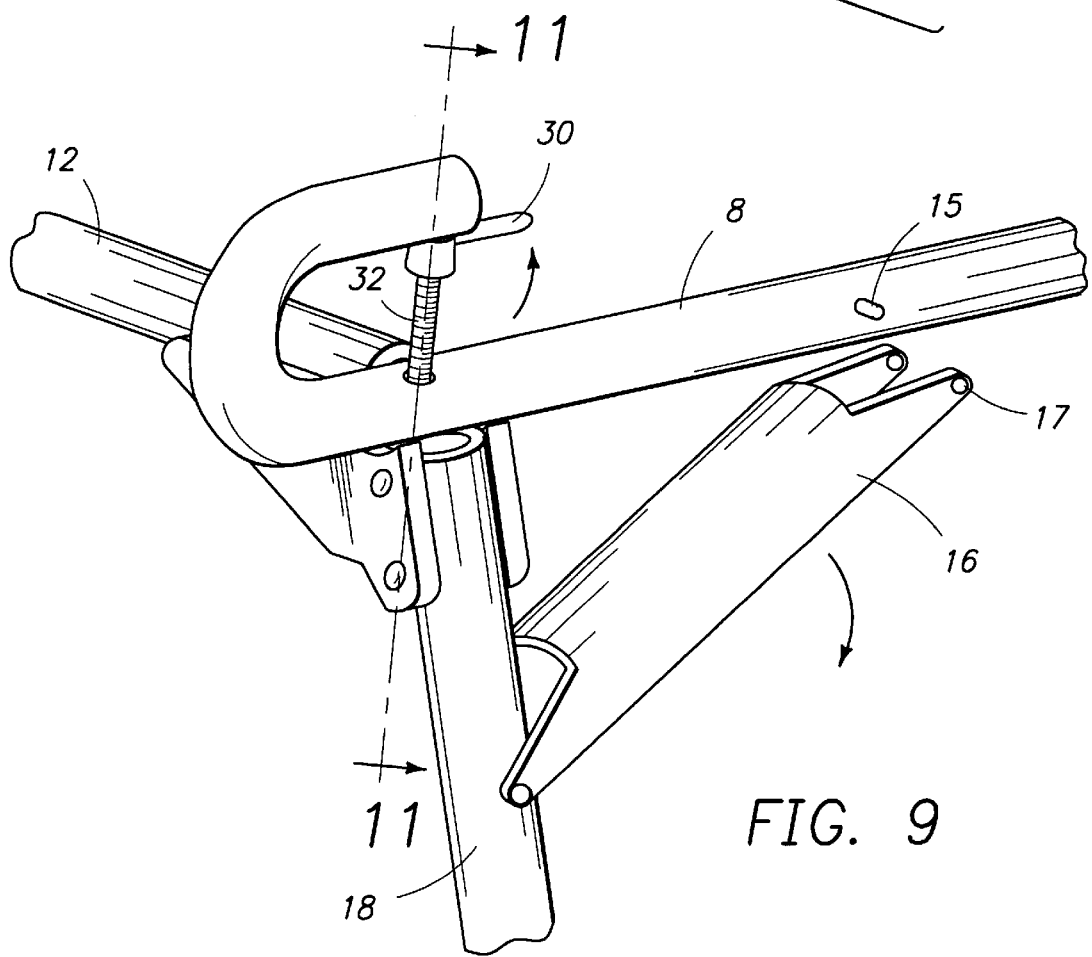
FIG. 9 is a detailed illustration of connecting one end of a side frame assembly to an end frame assembly.

One of the most unique features of this rack invention is the way that most of the stiffness of the structure is created in the corners of the rack, with little reliance on the truck itself to do anything but act as an anchor. This feature, which is illustrated in FIGS. 9 and 11, allows for a lot of flexibility in rack size to accommodate all full sized pickup trucks without compromising structural stiffness or strength. The method is illustrated by FIG. 9 which shows a side frame assembly 8 being secured to a corner of an end frame assembly. FIG. 11 is a cross-section view of the corner connection as in FIG. 9.

The top corners of the rack are made rigid by the combined action of the gussets 26 which are welded to the cross frame members, bearing against the angled outward leg members 18 in one direction; the struts 16 bearing outward in a plane 90 degrees to the plane of the gussets 26 and angled upward against the side frame 8 members, and finally the end portions of the side frame 8 which are seated in and screwed tightly down into the open corners that are formed by end frames and leg members. The corner members are thus prevented from moving apart sideways, and the frame corners become absolutely immoveable downwards when the rack is mounted, regardless of applied top down pressure.

A frame bolt 32 incorporates a bolt lever 30 that extends radially therefrom and is used to fasten the side frame assembly 8 to the corner; the bolt 32 being turned into a threaded hole in a tube end piece 19 located just inside the top end of a leg stanchion 18. The bolt 32 is preferably axially aligned with the stanchion 18 along its long axis, although an angled entry into the tube end piece 19 as shown is within the ambit of the present invention.

A strut 16 is pivoted on the stanchion 18, and fastened to the side frame assembly 8, using strut end holes 17 connected to two spring-loaded push pins 15 as shown in the partial cross-section view of FIG. 10.

The foregoing corner fastening method allows the structure of the rack corners (gussets, spring-loaded pins, etc.) to stay loose-and easy for manipulation until the upper corner bolts 32 are cinched down. When tightened by its lever 30, each bolt 32 takes substantially all play out of the adjustable elements such as telescoping tubes and spring loaded pins, creating a shearing action that jams the spring pins into the sides of their holes and producing a remarkably rigid structure.

FIGS. 12 and 13 show how the leg base member 20 is fastened to the side 4 of a pickup truck. A base bolt having a ring top portion 34 is inserted through a hole in the base member 20 and screwed into a stake pocket anchor device 36 that is permanently attached to the side 4 of the truck. The stake pocket anchor 36 is a readily available device that is described by U.S. Pat. No. 5,326,203 and which is hereby incorporated herein. This anchor device avoids any need to use a rail or any base fastening device that would permanently project above the sides of a pickup truck as commonly used by many available racks.

All structural members of the rack excepting gussets, struts and leg bases, are preferably made of steel tubing for strength. The gussets, struts and leg bases are made from steel sheet. In the case of a small rack intended for light weight carrying application with a small pickup truck, aluminum could be used for the rack structural elements. The fastening bolts however would still need to be made of steel. The rack 1 would remain relatively easy and fast to install or disassemble for packing away.

The rack design as described above incorporates an ability to be adjusted to fit several sizes of pickup truck body lengths and widths. It is simple in configuration, using no complex parts requiring special machining, and uses standard available fastening components. It is therefore economical to manufacture and could be made available to small pickup truck owners at a relatively low cost. It is also clear from the above description, that the rack is obviously easy to install, remove and store by any adult without tools or using much manual strength, as has been previously demonstrated by the inventor.

From the foregoing description, it is believed that the preferred embodiment achieves the objects of the present invention. Various modifications and changes may be made in the rack described above which are apparent to those skilled in the art. These alternatives and modifications are considered to be within the scope of the appended claims and are embraced thereby.

What is claimed is:

1. A collapsible overhead rack for mounting over an open bed pickup truck, said open bed having two opposed longitudinal sides, said rack comprising:

(a) means for anchoring said rack demountably to said longitudinal sides, said means for anchoring being located at two separated places on each side top corresponding to the expected position of the assembled rack leg members that support the rack;

(b) a pair of collapsible end frame assemblies for supporting the rack top, each end frame assembly comprising a pair of leg members and a cross frame assembly, said cross frame assembly comprising two tubular members adapted to be engaged telescopically, and incorporating means for quick disconnection of said tubular members and adjustment of the overall length of said cross frame assembly; said leg members and said cross frame assembly, each incorporating at its ends, means for quick disconnection of said cross frame assembly from said leg members, said leg members each being outwardly connected at their top ends at an angle of about 105 degrees to the axis of said cross frame assembly, said cross frame assembly including paralleled stiffening gussets at each end, said gussets being shaped to connect with the top portions of said leg members at an angle and location so as to produce open corners for seating an end of a side frame assembly, said leg members each including means for bracing a leg member to a side frame assembly; one said end frame assembly being located at the front end of said open bed, and the other end frame assembly located near the back end of said open bed;

(c) a pair of adjustable length, tubular side frame assemblies, each side frame assembly having looped ends for use in retaining and securing carried rack loads, each said side frame assembly comprising two tubular members adapted to be engaged telescopically, and incorporating means for quick disconnection of said tubular members and adjustment of the overall length of said side frame assembly; each side frame assembly being seated in and removably fastened to a top open corner on one side of each end frame assembly;

(d) four fastening screws for fastening said side frame assemblies to the top open corners of said end frame assemblies, said screws each incorporating a levered handle to facilitate tightening and opening, said screws when tightened in place, creating rigid, stiff corner structures at the top of said rack and resulting overall rack stiffness; and (e) four screw bolts for fastening said leg members to said means for anchoring said rack, said screw bolts including projecting ring ends to facilitate ease of fastening.

2. The rack according to claim 1, wherein the rack component parts are made of steel.

3. The rack according to claim 1, wherein the rack component parts are made of aluminum, excepting screws and bolts which are made of steel.

4. The rack according to claim 1, wherein each of said leg members comprise:

a tubular stanchion having a top end and a bottom end;

an end plug that is welded into the top end of said stanchion, said plug including a threaded hole for receiving a levered handle fastening screw; and a base member made of rigid flat plate material that is joined to said bottom end of said stanchion, adapted so that said stanchion projects upwards at an angle of about 75 degrees to the horizontal plane of said base member, resulting in an included angle of about 105 degrees between the axis of said stanchion and the axis of said cross frame assembly to which said top end of said stanchion is fastened, greatly stiffening said end frame assembly; said base member including two separated vertical holes for a screw bolt fastening said leg member to said means for anchoring said rack.

5. The rack according to claim 1, wherein said means for bracing a leg member to a side frame assembly includes a strut formed from metal channel having a "U" shaped cross section; said strut being pivotably fastened to a leg member at one strut end and positioned on said leg member to be able to rotate upwards towards the plane of a fastened in place side frame assembly; said strut including a hole in both sides near its distal end to connect with spring-loaded push pins that are located on said side frame assembly, said strut cooperating with said push pins to brace said leg member to said side frame assembly.

6. The rack according to claim 1, wherein said means for quick disconnection of said cross frame assembly from said leg members includes a multiplicity of spring-loaded push pins on said leg members cooperating with matching apertures on said cross frame assembly.

7. The rack according to claim 1, wherein said means for quick disconnection of said tubular members of said side frame assembly includes two spring-loaded push pins located near an insertion end of one said tubular member cooperating with matching apertures located near the receiving end of a mating tubular member.

8. The rack according to claim 1, wherein said means for anchoring said rack demountably includes a stake pocket anchor device, said anchor device being permanently attached to the longitudinal side wall of a truck bed at a location below the top edge of the wall, the device having a threaded bolt hole that is accessible through a hole in the top edge of the side wall for receiving a leg base fastening screw bolt.

9. A collapsible overhead rack for mounting over an open bed pickup truck, said open bed having two opposed longitudinal sides, said rack comprising:

(a) means for anchoring said rack demountably to said longitudinal sides, said means for anchoring being located at two separated places on each side top corresponding to the expected position of the assembled rack leg members that support the rack;

(b) a pair of collapsible end frame assemblies for supporting the rack top, each end frame assembly comprising a pair of leg members and a cross frame assembly, said cross frame assembly comprising two members adapted to be engaged and incorporating means for quick disconnection of said members and adjustment of the overall length of said cross frame assembly; said leg members and said cross frame assembly each incorporating at its ends means for quick disconnection of said cross frame assembly from said leg members, said leg members each including means for bracing a leg member to a side frame assembly; one said end frame assembly being located at the front end of said open bed and the other end frame assembly located near the back end of said open bed;

(c) a pair of adjustable length side frame assemblies, each side frame assembly comprising two members adapted to be engaged and incorporating means for quick disconnection of said members and adjustment of the overall length of said side frame assembly; each said side frame assembly being seated in and removably fastened to a top open corner on one side of each end frame assembly;

(d) means for fastening down said side frame assemblies to the top open corners of said end frame assemblies, incorporating a levered handle to facilitate tightening and opening; said means for fastening down producing rigid, stiff corner structures at the top of said rack, resulting in overall rack stiffness; and (e) means for fastening said leg members to said means for anchoring said rack.

* * * * *